Sept. 4, 1956  A. D. BUCHANAN  2,761,466
LIQUID LEVEL CONTROL VALVE
Filed Jan. 20, 1955
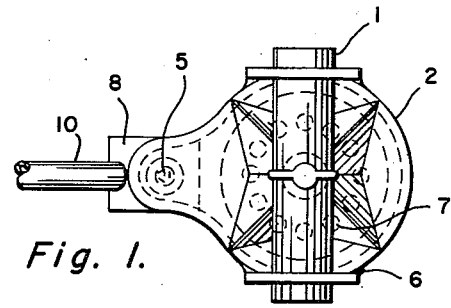
Fig. 1.
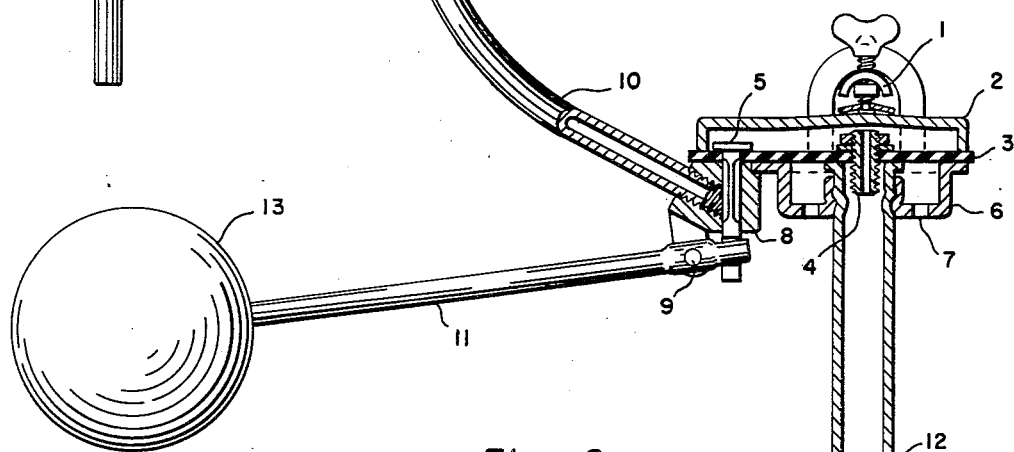
Fig. 2.
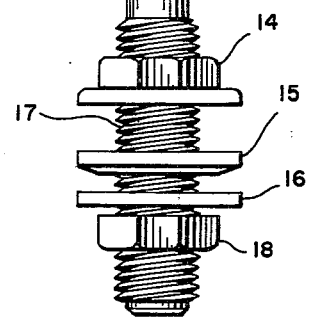
INVENTOR.
AVERY D. BUCHANAN
BY *Lothrop & West*
ATTORNEYS

United States Patent Office 2,761,466
Patented Sept. 4, 1956

2,761,466

LIQUID LEVEL CONTROL VALVE

Avery D. Buchanan, Sacramento, Calif.

Application January 20, 1955, Serial No. 483,066

3 Claims. (Cl. 137—414)

The invention relates to float actuated valves of the diaphragm type.

Figure 1 is a plan, a portion of the showing being broken away to reduce the extent of the figure.

Figure 2 is a side elevation, a portion being shown in median vertical section to reveal the interior construction.

A generally cup-shaped valve base 6 is provided around its bottom portion with a plurality of outlet apertures 7. Mounted on one side of the base 6 is a block 8 serving not only as a housing for an auxiliary valve stem 5 translatably disposed in a vertical bore within the block but also as a support for a float rod 11 pivotally mounted on a pivot pin 9 secured to the block 8 in horizontal attitude. The float rod has mounted thereon at one end a float 13 buoyantly supported by the water in a closet tank (not shown), and at the other end a rod extension which rocks about the pivot pin 9 in a direction of motion opposite to that of the float 13, the extension being in socket engagement with the lower end of the auxiliary valve stem 5 so that as the float falls downwardly with the water level on flushing, the auxiliary valve stem is lifted from its seat. As can be seen most clearly in Figure 2, the central and upper portions of the stem 5 is reduced in cross-section so that as the stem 5 is lifted from its seat water located in a chamber defined by a bonnet 2 is free to move downwardly along the stem 5 and outwardly through a refill tube 10 connecting with the bore.

The auxiliary valve stem 5 seats upon a portion of a resilient diaphragm 3 extending across the valve base 6 and over the block 8. The margin of the diaphragm is clamped securely to the periphery of the base by reason of the downward force exerted on the bonnet 2 by a valve bonnet retainer assembly comprising an inverted U-shaped plate 1 having a central tapped aperture in threaded engagement with a thumb screw bearing downwardly against the top of the bonnet 2, upward thrust being taken by a pair of inverted U-shaped lugs upstanding from opposite sides of the valve base 6.

Centrally mounted on the diaphragm 3 is an orificed fitting 4 coaxially disposed with respect to a water supply tube 12 secured to a central opening in the valve base 6, the tube 12 terminating in an upper end substantially coplanar with the upper edge or lip of the valve base 6.

A spud top nut 14 is in threaded engagement with a spud nipple 17 adjacent the lower end of the water supply tube 12, and with the customary spud washer 15, friction washer 16 and spud anchor nut 18, serves to mount the device in a conventional water closet in water tight relation.

Referring to the accompanying drawing and Fig. 2 which shows the valve in a closed position, the operation of this valve is as follows:

When water is released from tank (as in flushing a water closet) float 13 drops and by means of float rod 11 hinged on hinge pin 9 and extending through opening in auxiliary valve 5 stem, slidably disposed in a stem housing 8 raises auxiliary valve 5 from seat (rubber or synthetic diaphragm) 3 thus releasing water on top of diaphragm 3 past triangular auxiliary valve stem 5 to refill tube 10. As the waterflow area around auxiliary valve stem 5 is greater than area of operating hydraulic orifice 4, this action releases the pressure on the top side of diaphragm 3 (which also acts as the main valve and auxiliary valve seat) causing diaphragm 3 to be raised from its seat (upper end of supply tube 12) by the pressure of incoming water thus permitting the major amount of water to discharge through orifices 7 in valve base 6 into tank thereby refilling tank until float 13 raises to proper level and returns auxiliary valve 5 to its seat on top of diaphragm 3. When the auxiliary valve 5 closes, the water entering through operating hydraulic orifice 4, builds up pressure above diaphragm 3 in chamber formed by valve bonnet 2 which is held against diaphragm and valve base 6 by valve bonnet retainer assembly 1 which is a cross bar threaded as shown for thumb screw and is shown in place through U shaped lugs which are integral with valve base 6. The area of diaphragm 3 being much greater than area of end of supply tube 12, the pressure built up in the above mentioned chamber by constant water pressure through operating hydraulic orifice 4 forces diaphragm 3 against its seat (end of supply tube 12) and shuts off all water until tank is again flushed.

Fig. 1 shows triangular construction of auxiliary valve stem and discharge orifices to tank. The number of these orifices are sufficient to cause quiet refilling of tank very similar to those orifices found in showerbath shower heads. Any of the parts shown and numbered, not mentioned in this application are omitted because they have been in use for year and are only shown to complete the valve picture.

Although but one specific form of this invention is herein shown, it will be understood that variation of the construction shown may be done without departing from the spirit of this invention as defined by the following claims.

What I claim as my invention is:

1. A water closet valve comprising a base including a cylindrical drum having its upper edges out-turned to form a peripheral flange disposed in a common plane and its lower end covered by an apertured wall, said apertured wall having formed therein a large central opening and a plurality of small openings surrounding said large central opening, a water supply tube projecting upwardly through said large central opening in said apertured wall and terminating at its upper end in a location coplanar with said flange, an auxiliary valve body mounted on said flange and depending therefrom, a resilient diaphragm mounted on said peripheral flange and covering the upper ends of said drum and said supply tube, said auxiliary valve body, said flange and said diaphragm being pierced by a through bore, an auxiliary valve, said auxiliary valve including a stem slidably disposed in said bore and projecting therefrom and a transverse head at the upper end of said stem adapted to seat against the adjacent portion of said diaphragm, said stem having a central portion having a cross sectional size less than the cross section of said bore, a transverse through bore in said body in communication with the central portion of said bore, a bonnet clampingly mounted on the upper side of said diaphragm, float means for moving said auxiliary valve head toward and away from its seat on said diaphragm in dependence upon the water level in said water closet, and an orifice of predetermined size in said diaphragm in a location adjacent the center of the upper end of said supply tube.

2. In a liquid level control valve comprising a substantially cylindrical base projecting downwardly from a peripheral flange, a water supply tube extending upwardly through said base to the elevation of said flange and forming with said base an annular chamber, said chamber having an opening near the bottom in communication with the atmosphere, a resilient diaphragm mounted on said flange and having a substantially centrally located orifice therein, a bonnet mounted on said diaphragm and secured to said base to form a bonnet chamber above said diaphragm, the combination of an auxiliary valve body mounted on the lower side of one portion of said flange, there being a vertical aligned passage through said body, said flange and said diaphragm and a transverse channel in said body from said passage to the atmosphere, a valve stem slidably disposed in said passage and projecting exteriorly downwardly therefrom, the central longitudinal portion of said stem being reduced in size, a valve head on the upper end of said stem and adapted to seat against the adjacent portion of the upper portion of said diaphragm, and float means mounted on said auxiliary valve body for reciprocating said stem whereby said head is lifted from its seat as said float means is lowered and is urged against its seat as said float means is raised.

3. In a water closet valve comprising a lower cylindrical drum forming a chamber and vented to the atmosphere, a water supply tube extending into said lower chamber coterminous with the upper periphery thereof, a diaphragm covering the upper ends of said chamber and said tube, said diaphragm having a small center orifice, a bonnet mounted on the periphery of said flange and forming an upper chamber, the combination of an auxiliary valve mechanism eccentrically mounted on one portion of said drum and extending away therefrom in the same direction as and substantially parallel to said supply tube, said auxiliary valve mechanism including a valve body, a valve stem and a valve head on said stem, said head being movable by said stem away from and into engagement with said diaphragm as a valve seat, and float means on said valve mechanism for moving said stem.

References Cited in the file of this patent
UNITED STATES PATENTS

| | | |
|---|---|---|
| 164,645 | Hadfield | June 22, 1875 |
| 209,867 | Craigie | Nov. 12, 1878 |
| 925,538 | Weaver et al. | June 22, 1909 |
| 2,228,552 | Arbogast | Jan. 14, 1941 |
| 2,588,242 | Hunter | Mar. 4, 1952 |
| 2,670,007 | Adams | Feb. 23, 1954 |